United States Patent [19]

Kremer et al.

[11] Patent Number: 5,400,522
[45] Date of Patent: Mar. 28, 1995

[54] FRAME MEASUREMENT PLATFORM

[75] Inventors: Thomas J. Kremer, Loveland; Thomas J. Ziegler, Cincinnati, both of Ohio

[73] Assignee: The United States Shoe Corporation, Cincinnati, Ohio

[21] Appl. No.: 980,332

[22] Filed: Nov. 23, 1992

Related U.S. Application Data

[63] Continuation-in-part of Ser. No. 816,625, Dec. 31, 1991, Pat. No. 5,175,941.

[51] Int. Cl.6 .............................. G01B 5/14; A61B 3/10
[52] U.S. Cl. ......................................... 33/810; 33/200; 33/573
[58] Field of Search ................. 33/810, 811, 812, 200, 33/507, 549, 572, 573; 351/41, 178, 204

[56] References Cited

U.S. PATENT DOCUMENTS

| | | | |
|---|---|---|---|
| 734,730 | 7/1903 | Millard | 33/200 |
| 993,252 | 5/1911 | Jaffe | 33/200 |
| 2,576,659 | 11/1951 | Williams, Jr. | 33/200 |
| 2,577,533 | 12/1951 | Loveridge | 33/200 |
| 3,315,369 | 4/1967 | Johnson | 33/200 |
| 4,625,418 | 12/1986 | Joncour et al. | 33/200 |
| 4,646,445 | 3/1987 | Wehmeier | 33/200 |
| 4,693,573 | 9/1987 | Zoueki | 33/200 |

FOREIGN PATENT DOCUMENTS

| | | | |
|---|---|---|---|
| 462265 | 7/1928 | Germany | 33/810 |
| 3518215 | 10/1985 | Germany | 351/204 |
| 2240405 | 7/1991 | United Kingdom | 33/200 |

*Primary Examiner*—Thomas B. Will
*Attorney, Agent, or Firm*—Frost & Jacobs

[57] ABSTRACT

There is provided a frame measurement platform for measuring the perpendicular distance between the two temples of an open eyeglass frame, and a method for using such a device. The platform includes a support, two spaced-apart reference members which are moveable with respect to each other, and measuring scale. The reference members define respective temple measuring planes which are substantially perpendicular to a reference measuring plane defined by the support. The measuring scale is used to measure the perpendicular distance between temples of an open eyeglass frame.

14 Claims, 3 Drawing Sheets

FRAME MEASUREMENT PLATFORM

RELATED APPLICATIONS

This is a continuation-in-part of U.S. Pat. application Ser. No. 07/816,625, filed Dec. 31, 1991, now U.S. Pat. No. 5,175,941, which is incorporated herein by reference.

TECHNICAL FIELD

The present invention relates generally to an apparatus and method for use in fitting eyewear, and is particularly directed to an apparatus for measuring the perpendicular distance between temples of eyeglass frames, and a method for using such apparatus and the measurement to fit eyewear to a wearer. The invention will be specifically disclosed in connection with a frame measuring platform that facilitates the measurement of the perpendicular distance between the temples pieces of an eyeglass frame.

BACKGROUND OF THE INVENTION

Set forth in the co-pending application identified above is a method for fitting eyewear to a wearer. One of the steps of that method disclosed therein includes determining the temple to temple frame size of each frame of the stock of frames from which the wearer will select his or her frame. When this determination is made by actually measuring the temple to temple frame size, several problems are encountered.

When the frames are open, it is difficult to maintain the temples parallel to each other and perpendicular to the front of the frame, so as to obtain an accurate temple to temple measurement. It is also difficult to keep the caliper or scale perpendicular to the temples. In order to get an acceptable accurate temple to temple measurement (dimension G in FIG. 3 of the co-pending application), it is necessary that the temple pieces be substantially parallel to each other and substantially perpendicular to the front of the frame, and, concomitantly, to plane 16 (FIG. 3 of the co-pending application).

It is also necessary that the measurement be taken at locations along each temple piece which are equidistant from the frame front or plane 16. When this measurement is taken freehand, it is difficult to locate accurately both ends of the measuring device at locations equidistant from plane 16 while maintaining the desired parallelism and perpendicularity of the temple pieces.

Another problem in measuring this dimension is the potential for scratching the frames or lenses (if any). If the frames are placed on an unacceptable surface, that surface may result in scratches to the frame, particularly the front of the frame, or lenses. If metal calipers are used to measure this distance, scratches in the temple pieces may result. Avoiding these problems while taking a freehand measurement requires a significant amount of time, and frequently results in inaccurate measurements or scratches.

Thus, there is a need for a device which allows the quick, efficient and accurate measurement of the perpendicular distance between the temples. Such a device should be made of a material which will not easily scratch the eyeglass frame being measured.

SUMMARY OF THE INVENTION

It is an object of the present invention to obviate the above-described problems and shortcomings.

It is another object of the present invention to provide an apparatus and method for measuring the temple to temple frame size which takes the measurement at locations along the temple pieces which are equidistance from the front of the frame.

It is yet another object of the present invention to provide an apparatus and method which assists in maintaining the desired parallelism and perpendicularity of the temple pieces of an eyeglass frame while measuring the temple to temple frame size.

Yet another object of the present invention is to provide an apparatus and method which reduces the risk of scratching the eyeglass frame or lenses while measuring the temple to temple frame size.

A still further object of the present invention is to provide a method for use in fitting eyeglass frames.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided a device for measuring the perpendicular distance between the two temples of an open eyeglass frame. The device includes a support which defines a reference measuring plane, and first and second reference members carried by the support. The reference members are spaced apart from and moveable with respect to each other, and each includes a respective reference surface which defines a temple measuring plane that is substantially perpendicular to the reference measuring plane. The support and reference members are configured to receive an open eyeglass frame such that at least a portion of each temple piece is disposed adjacent a respective reference surface of each reference member. The device includes means for measuring the perpendicular distance between the temples when the temples are placed in contact with the reference surfaces.

In accordance to a further aspect of the invention, the measuring means include a measuring scale which has two measuring tips that are moveable with respect to each other.

According to a further aspect of the invention, the measuring scale includes indicator means for indicating on the measuring scale a location corresponding to the distance between the measuring tips. The scale also includes a plurality of designations which identify temple to temple size ranges, the designations being located such that the indicator means indicate the designation of the temple to temple size range within which the distance between the measuring tips falls.

In a still further object of the invention, the first and second reference members include means for receiving and supporting the measuring means.

In accordance to a further aspect of the invention, at least one slot is formed through each reference member for receiving the measuring means.

According to yet a further aspect of the invention, the slots are substantially parallel to the reference measuring plane.

In yet another aspect of the invention, a device for measuring the perpendicular distance between the two temples of an open eyeglass frame is provided which includes a support and first and second reference members carried by the support. The support includes a base, an upper portion overlying the base and defining a reference measuring plane, and an intermediate portion interposed between the base and the upper portion. The first and second reference members respectively include a base portion and a reference surface extending from the base portion which defines a temple measuring plane that is substantially perpendicular to the reference measuring plane. The two reference members are spaced apart from and moveable with respect to each other, and have at least one scale receiving slot formed through the planar portion. The device includes a measuring scale having first and second measuring tips, the scale being adapted to be received by the respective scale receiving slots of the first and second reference members.

In accordance to a further aspect of the present invention, the upper portion of the support is non-parallel to the base.

According to a further aspect of the present invention, the angle between the upper portion and the base is acute.

In yet another aspect of the invention, the scale receiving slot is substantially parallel to the reference measuring plane.

In accordance to yet another aspect of the invention, the support includes a retaining portion extending from the base spaced apart from the second portion, and cooperating with the base and the upper portion to retain the base portion of at least one of the first and second reference members.

According to a still further aspect of the present invention, at least one of the first and second reference members includes a slot formed therethrough which slidably receives a portion of the upper portion of the support.

In a still further aspect of the present invention, a method of fitting an eyeglass frame to a wearer, the wearer having a second eyeglass frame which had been previously fitted to or worn by the wearer, is provided which includes the steps of providing a plurality of frames which have been identified as having a temple to temple frame size falling within at least one (f several predetermined temple to temple size ranges. At least one temple to temple size range is identified as corresponding to the wearer, by determining the temple to temple frame size of the second eyeglass frame of the wearer. An eyeglass frame is fitted to the wearer selected from a plurality of frames having a temple to temple frame size falling within at least one temple to temple size range corresponding to the wearer.

In yet another aspect of the invention, the temple to temple frame size of the second eyeglass frame of the wearer is determined by measuring the temple to temple frame size of the second eyeglass frame of the wearer.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
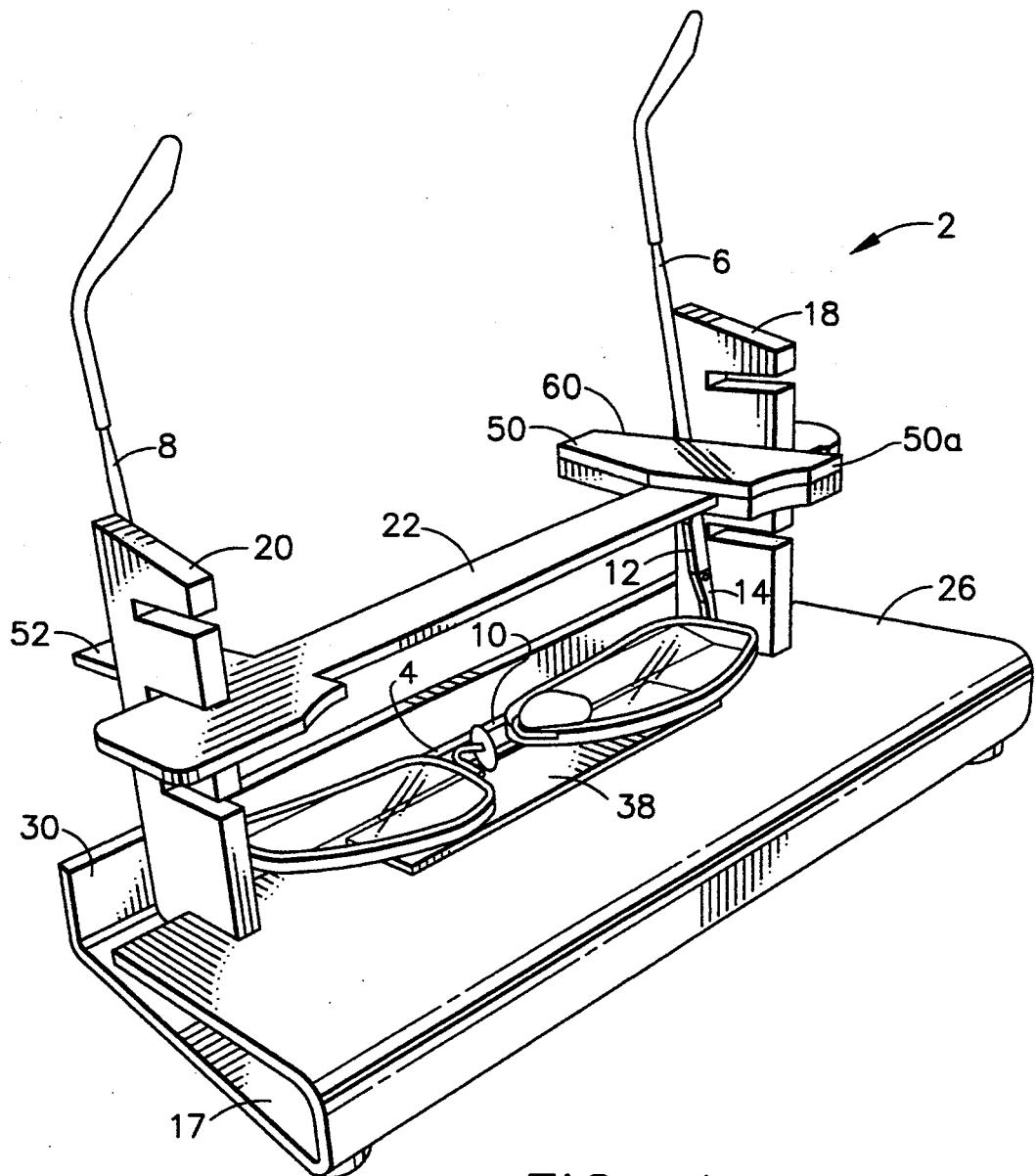
FIG. 1 is a perspective view of one embodiment of a frame measurement platform in accordance with the present invention, with an open eyeglass frame shown in the measuring position.

Referring now to the drawings, FIG. 1 is a perspective view of an embodiment of a frame measurement platform 2 constructed in accordance with the teachings of the present invention. Eyeglass frame 4 is open, having temple pieces 6 and 8 extended from front 10 of eyeglass frames 4. Temple pieces 6 and 8 are illustrated as being generally flat and elongate, having enlarged portion 12 (of temple piece 6 - the corresponding portion of temple piece 8 not being visible in FIG. 1) adjacent hinge 14 which is illustrated as not being flat or elongate. Enlarged portion 12 diagrammatically represents any configuration of a temple piece which is not flat or elongate, such as ornamentation, cosmetic or other construction.

Figure 2:
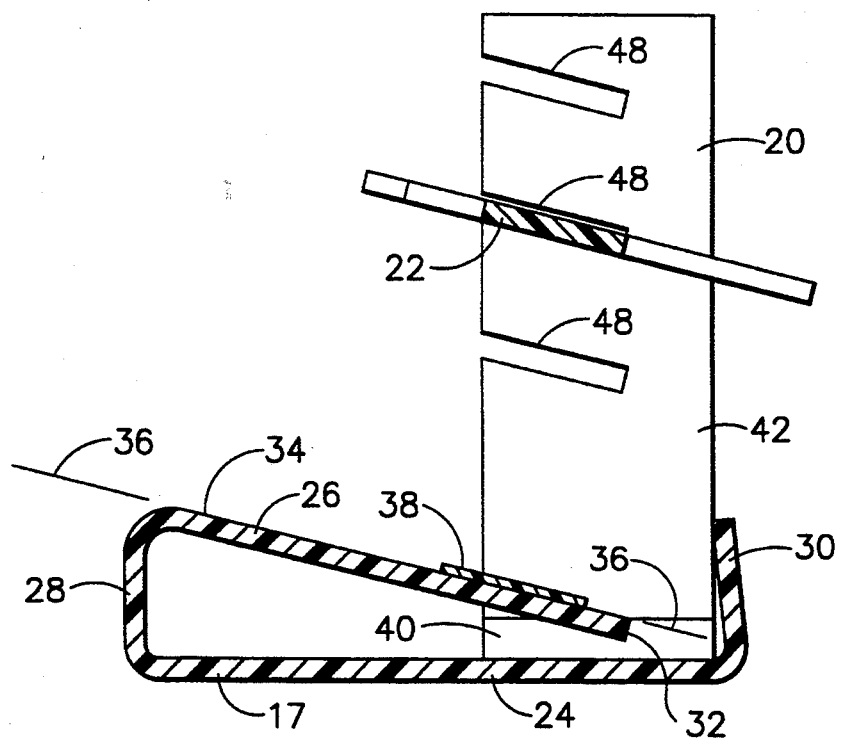
FIG. 2 is a cross-sectional view taken through the middle of the frame measurement platform of FIG. 1 in the direction toward the left reference member.

Frame measurement platform 2 includes support 17, first and second reference members 18 and 20, and measuring scale 22. Referring now to FIG. 2, support 17 is shown in cross-section having base 24, upper portion 26 and intermediate portion 28 interposed therebetween. As shown in FIG. 2, base 24 and upper portion 26 are substantially planar, although other configurations and shapes can be used. Second portion 26 overlies base 24. Support 17 is illustrated as being of a uniform width such that the widths of upper portion 26 and base 24 are identical. However, variations in these widths are within the scope of the teachings of this invention, and the width of upper portion 26 may be different than that of base 24. Upper surface 34 of upper portion 26 defines reference measuring plane 36. Pad 38 is carried by upper portion 26, and is made of a material which will not easily scratch eyeglass frame 4 or its lenses.

Support 17 also includes retaining portion 30 extending from base 24. Retaining portion 30 is spaced apart from end 32 of upper portion 26.

Since first and second reference members 18 and 20 are illustrated as being mirror images of each other, reference will be made generally to second reference member 20, it being, understood that first reference member 18 is of similar, mirror image construction.

Figure 3:
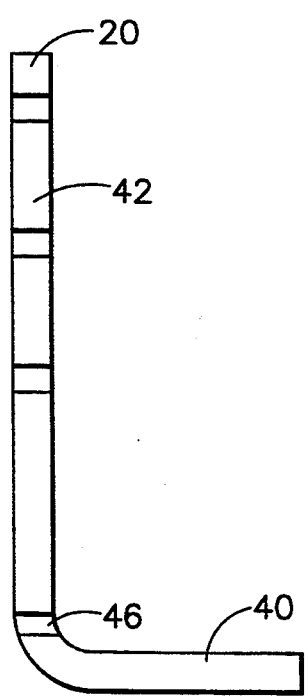
FIGS. 3 and 4 are front and side views, respectively, of the left reference member illustrated in FIG. 1.
Figure 4:
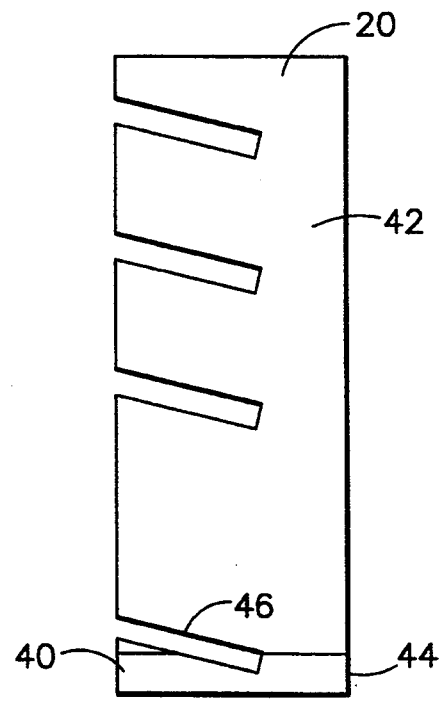

Referring to FIGS. 2, 3 and 4, second reference member 20 includes base portion 40 and reference surface 42 which extends from base portion 40. Reference surface 42 defines a temple measuring plane which is substantially perpendicular to base portion 40. Second reference member 20 is carried by support 17 such that the temple measuring plane is substantially perpendicular to reference measuring plane 36. Reference surface 42 is illustrated as being substantially planar, although other configurations which define the temple measuring plane can be used. Reference surface 42 includes a plurality of slots 48 formed therethrough for receiving measuring scale 22, which are disposed substantially parallel to reference measuring plane 36. However, it is noted that slots 48 do not have to be parallel to reference measuring plane 36.

Support 17 is adapted to support and retain base portion 40 through the cooperation of base 24, upper portion 26 and retaining portion 30. It is noted that retaining portion 30 forms an acute angle with base 24, i.e. of less than 90°, thereby providing clearance between edge 44 of base portion 40 and the rounded corner formed between base 24 and retaining portion 30. Second reference member 20 includes slot 46 into which end 32 extends such that slot 46 slidably receives a portion of upper portion 26, allowing second reference member 20 to be moveable with respect to support 17. Slot 46 is located on second reference member 20 such that base portion 40 includes a portion of slot 46. This allows upper portion 26 to be in contact with base portion 40, such that, when the gap between end 32 and base 24 is less than the residual thickness of base portion 40, upper portion 26 resiliently urges second reference member 20 against base 24, thereby maintaining base portion 40 in close contact with base 24.

Figure 5:
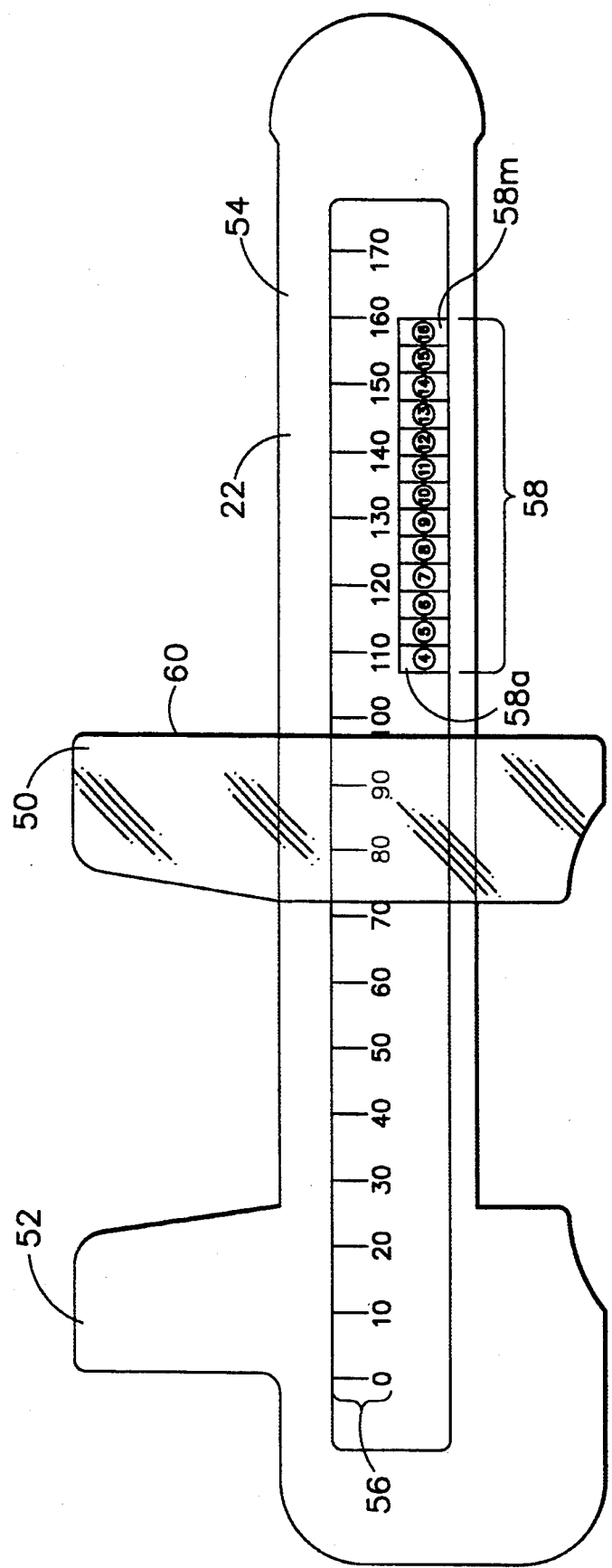
FIG. 5 is a plane view of the measuring scale illustrated in FIG. 1.

Referring now to FIG. 5, measuring scale 22 includes first and second measuring tips 50 and 52 which are moveable with respect to each other. Measuring tip 52 is illustrated being fixed with respect to body 54 of measuring scale 22, while measuring tip 50 is slidable therealong. Measuring scale 22 carries numeric scale 56, as well as a plurality of designations 58. As best seen in FIG. 1, upper layer 50a of measuring tip 50 is transparent so as allow measuring scale 22, and in particular numeric scale 56 and plurality of designations 58, to be viewable therethrough. Each respective designation, 58a through 58m identify a respective temple to temple size range, which is described in the co-pending application. As illustrated, each designation is identified by a respective number, e.g. 4 through 16 as illustrated, which is located on a color field (shown as rectangular boxes and not being shaded in the drawings to maintain clarity). Any identifying designation may be used, including the numbers for colors alone or together as illustrated. Plurality of designations 58 are located on measuring scale 22 at respective locations such that edge 60 indicates the respective designation 58a through 58m of the temple to temple size range within which the distance between measuring tips 50 and 52 falls. Edge 60 functions as indicator means for indicating on measuring scale 22 a location which corresponds to the distance between measuring tips 50 and 52. Other structures and means for indicating such locations on scale 22 will be readily apparent from this disclosure.

Referring now to FIG. 1, frame measurement platform 2 is shown in use. Frame 4 is located against retaining portion 30 with the frame hinges adjacent first and second reference members 18 and 20, and overlying upper portion 26, with pad 38 protecting frame 4 (and its lenses if any) from scratches. Frame 4 is located between spaced apart first and second reference members 18 and 20, with temple pieces 6 and 8 in the extended position, disposed adjacent the respective reference surfaces of first and second reference members 18 and 20. Measuring scale 22 is shown disposed in the middle slot of slots 48, so that measuring tips 50 and 52 contact temple pieces 6 and 8, above portion 12.

In use, measuring tips 50 and 52 are moved away from each other to engage temple pieces 6 and 8, preferably placing them in contact with the respective reference surfaces of first and second reference members 18 and 20, generally parallel to the temple measuring planes defined thereby. The designation corresponding to the temple to temple size range within which the distance between measuring tips 50 and 52 fall, is indicated by edge 60.

The mirror image spacing between slots 48 of first reference member 18 and second reference member 20 locates measuring tips 50 and 52 at locations along temple pieces 6 and 8 which are equidistance from front 10 (as well as plane 16). In this orientation, plane 16 is generally coplanar to reference measuring plane 36, although it is not absolutely required. It is acceptable for front 10 of frame 4 to be located at various angles to reference measuring plane 36, so long as temples 6 and 8 can be measured in planes which are substantially perpendicular to reference measuring plane 36 (i.e. the respective included angles between the temples and the frame front are substantially equal).

Preferably, scale 22 is located in the lowest scale receiving slot 48 which allows the perpendicular distance between temple pieces 6 and 8 to be measured without encountering or being interfered by portion 12. First and second reference members 18 and 20 are shown having a plurality of slots 48, although a single slot in each of first and second reference members 18 and 20 is acceptable as long as portion 12 can be avoided.

Although first and second reference members 18 and 20 are illustrated as being moveable with respect to each other and to support 17, other constructions are possible. For example, one of first and second reference members 18 and 20 could be fixed with respect to support 17, such as by being formed integrally therewith, with the other reference member being moveable. Another possible construction includes both first and second reference members 18 and 20 being fixed with respect to support 17, with support 17 being constructed such that reference members 18 and 20 are moveable with respect to each other. In such a case, support 17 could be formed of two halves, with one half fitting inside the other so as to be slidable and moveable with respect to the other half of support 17.

Upper portion 26 of support 17 is inclined downwardly with respect to base 24 as well as retaining portion 30. This configuration helps to maintain frame 4 in the measuring position, although other orientations of upper portion 26 are possible. This inclination also allows the user of frame measurement platform 2 a better view of frame 4 and scale 22.

As described, frame measurement platform 2 can be used to determine the temple to temple frame size of an eyeglass frame by using it to measure the perpendicular distance between the temple pieces. It may also be used in practicing a method of fitting an eyeglass frame to a wearer when the wearer has a second eyeglass frame which has previously been fitted to or worn by that wearer. In the co-pending application, a method of fitting an eyeglass frame to a wearer was described which included identifying at least one temple to temple size range as corresponding to the wearer. As previously disclosed, one way is to measure the temple to temple size range of the wearer. However, when the wearer has another eyeglass frame which has previously been properly fitted to or acceptably worn by that wearer, another way is available to determine the temple to temple size range corresponding to that wearer. In this other method, the temple to temple frame size of the second eyeglass frame of the wearer is determined in order to identify the temple to temple size range corresponding to the wearer. This may be done by measuring the temple to temple frame size of the second eyeglass frame. Alternatively, the temple to temple frame size of the second eyeglass frame may be known from previous fittings.

Frame measurement platform 2 is constructed of plastic or other material which will not easily scratch frame 4 or lenses.

In summary, numerous benefits have been described which result from employing the concepts of the invention. The frame measurement platform allows the temple pieces to be maintained substantially parallel to each other and substantially perpendicular to the front of the frame while measuring the perpendicular distance between the temple pieces at a location which is substantially equidistant from the front of the eyeglass frames.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A device for measuring the perpendicular distance between the two temples of an open eyeglass frame, comprising:
   (a) a support defining a reference measuring plane;
   (b) a first reference member carried by said support, said first reference member including a reference surface which defines a temple measuring plane which is substantially perpendicular to said reference measuring plane;
   (c) a second reference member carded by said support, said second reference member including a reference surface which defines a temple measuring plane which is substantially perpendicular to said reference measuring plane, said second reference member being spaced apart from said first reference member, said first and second reference members being moveable with respect to each other;
   (d) said support and first and second reference members being configured to receive an eyeglass frame such that, when said frame is open, at least a portion of each respective temple is disposed adjacent a respective reference surface of said first and second reference members; and
   (e) measuring means for measuring the perpendicular distance between said temples when said temples are placed in contact with said respective reference surfaces of said first and second reference members, said measuring means comprising a measuring scale having first and second measuring tips which are moveable with respect to each other, said first and second measurement tips being confirmed to contact a respective temple.

2. The device of claim 1 wherein said measuring scale comprises:
   (a) indicator means for indicating on said measuring scale a location which corresponds to the distance between the measuring tips; and
   (b) a plurality of designations carried by said measuring scale, each respective designation identifying a respective temple to temple size range, said designations being located on said measuring scale at respective locations such that said indicator means indicate the respective designation of the temple to temple size range within which the distance between said measuring tips falls.

3. A device for measuring the perpendicular distance between the two temples of an open eyeglass frame, comprising:
   (a) a support defining a reference measuring plane;
   (b) a first reference member carried by said support, said first reference member including a reference surface which defines a temple measuring plane which is substantially perpendicular to said reference measuring plane;
   (c) a second reference member carried by said support, said second reference member including a reference surface which defines a temple measuring plane which is substantially perpendicular to said reference measuring plane, said second reference member being spaced apart from said first reference member, said first and second reference members being moveable with respect to each other;
   (d) said support and first and second reference members being configured to receive an eyeglass frame such that, when said frame is open, at least a portion of each respective temple is disposed adjacent a respective reference surface of said first and second reference members; and
   (e) measuring means for measuring the perpendicular distance between said temples when said temples are placed in contact with said respective reference surfaces of said first and second reference members, said first and second reference members including means for receiving and supporting said measuring means.

4. The device of claim 3 wherein said means for receiving and supporting said measuring means comprise at least one respective slot formed through each respective reference surface of said first and second reference members.

5. The device of claim 4 wherein each of said at least one respective slot is substantially parallel to said reference measuring plane.

6. A device for measuring the perpendicular distance between the two temples of an open eyeglass frame, comprising:
   (a) a support including
      (i) a base;
      (ii) an upper portion overlying said support portion, said upper portion defining a reference measuring plane; and
      (iii) an intermediate portion interposed between said base and said upper portion;

(b) first and second reference members carried by said support, each said first and second reference member respectively including a base portion and a reference surface extending from said base portion, said reference surface defining a temple measuring plane which is substantially perpendicular to said reference measuring plane, said second reference member being spaced apart from said first reference member, said first and second reference members being moveable with respect to each other, each of said respective reference surfaces having at least one respective scale receiving slot formed therethrough;

(c) said support being adapted to support and retain said respective base portion of at least one of said first and second reference members;

(d) said support and first and second reference members being configured to receive an eyeglass frame such that, when said frame is open, at least a portion of each respective temple is disposed adjacent a respective reference surface of said first and second reference members; and (e) a measuring scale having first and second measuring tips which are moveable with respect to each other, said scale being adapted to be received by each of said at least one respective scale receiving slot whereby the perpendicular distance between said temples may be measured when said temples are placed in contact with said respective reference 6 surfaces of said first and second reference members.

7. The device of claim 6 wherein said upper portion of said support is non-parallel to said base.

8. The device of claim 7 wherein the angle between said upper portion and said base is acute.

9. The device of claim 6 wherein said at least one scale receiving slot is substantially parallel to said reference measuring plane.

10. The device of claim 6 wherein said measuring scale comprises:
(a) indicator means for indicating on said measuring scale a location which corresponds to the distance between the measuring tips; and
(b) a plurality of designations carried by said measuring scale, each respective designation identifying a respective temple to temple size range, said designations being located on said measuring scale at respective locations such that said indicator means indicate the respective designation of the temple to temple size range within which the distance between said measuring tips falls.

11. The device of claim 6 wherein said support includes a retaining portion extending from said base, said retaining portion being spaced apart from said upper portion and cooperating with said base and said upper portion to retain said base portion of at least one of said first and second reference members.

12. The device of claim 11 wherein at least one of said first and second reference members includes a slot formed therethrough which slidably receives a portion of said upper portion of said support.

13. A method of determining the temple to temple frame size of an eyeglass frame, comprising the steps of:
(a) providing means for measuring the temple to temple frame size of the eyeglass frame, said means including:
(i) a support defining a reference measuring plane;
(ii) a first reference member carried by said support, said first reference member including a reference surface which defines a temple measuring plane which is substantially perpendicular to said reference measuring plane;
(iii) a second reference member carried by said support, said second reference member including a reference surface which defines a temple measuring plane which is substantially perpendicular to said reference measuring plane, said second reference member being spaced apart from said first reference member, said first and second reference member being moveable with respect to each other;
(iv) said support and first and second reference members being configured to receive an eyeglass frame such that, when said frame is open, at least a portion of each respective temple is disposed adjacent a respective reference surface of said first and second reference members; and
(v) measuring means for measuring the perpendicular distance between said temples when said temples are placed in contact with said respective reference surfaces of said first and second reference members, said measuring means comprising a measuring scale having first and second measuring tips which moveable with respect to each other, said measuring scale comprising indicator means for indicating on said measuring scale a location which corresponds to the distance between the measuring tips, and a plurality of designations carried by said measuring scale, each respective designation identifying a respective temple to temple size range, said designations being located on said measuring scale at respective locations such that said indication means indicate the respective designation of the temple to temple size range within which the distance between said measuring tips falls; and
(b) measuring the temple to temple frame size of the eyeglass frame.

14. A method of determining the temple to temple frame size of an eyeglass frame, comprising the steps of:
(a) providing means for measuring the temple to temple frame size of the eyeglass frame, said means including:
(i) a support including
a base;
an upper portion overlying said support portion, said upper portion defining a reference measuring plane; and
an intermediate portion interposed between said base and said upper portion;
(ii) first and second reference members carried by said support, each said first and second reference member respectively including a base portion and a reference surface extending from said base portion, said reference surface defining a temple measuring plane which is substantially perpendicular to said reference measuring plane, said second reference member being spaced apart from said first reference member, said first and second reference members being moveable with respect to each other, each of said respective reference surfaces having at least one respective scale receiving slot formed therethrough;

(iii) said support being adapted to support and retain said respective base portion of at least one of said first and second reference members;
(iv) said support and first and second reference members being configured to receive an eyeglass frame such that, when said frame is open, at least a portion of each respective temple is disposed adjacent a respective reference surface of said first and second reference members; and
(v) a measuring scale having first and second measuring tips which are moveable with respect to each other, said scale being adapted to be received by each of said at least one respective scale receiving slot whereby the perpendicular distance between said temples may be measured when said temples are placed in contact with said respective reference surfaces of said first and second reference members; and (b) measuring the temple to temple frame size of the eyeglass frame.

* * * * *

UNITED STATES PATENT AND TRADEMARK OFFICE
CERTIFICATE OF CORRECTION

PATENT NO. : 5,400,522
DATED : March 28, 1995
INVENTOR(S) : Thomas J. Kremer & Thomas J. Ziegler It is certified that error appears in the above-indentified patent and that said Letters Patent is hereby corrected as shown below:

Column 7, line 51, change "carded" to --carried--.

Column 8, line 5, change "confirmed" to --configured--.

Column 9, line 30, delete "6"

Column 10, line 28, after "which" insert --are--.

Signed and Sealed this

Fifth Day of September, 1995

Attest:

BRUCE LEHMAN

Attesting Officer

Commissioner of Patents and Trademarks